United States Patent
Thomasberger et al.

(10) Patent No.: US 10,712,753 B2
(45) Date of Patent: Jul. 14, 2020

(54) METHOD AND APPARATUS FOR THE ENERGY-EFFICIENT OPERATION OF SECONDARY DUST REMOVAL SYSTEMS

(71) Applicant: SMS Group GmbH, Duesseldorf (DE)

(72) Inventors: Joerg Thomasberger, Duesseldorf (DE); Volker Trappmann, Krefeld (DE); Malte Braam, Krefeld (DE); Felix Schuppert, Sprockhoevel (DE)

(73) Assignee: SMS GROUP GMBH, Duesseldorf (DE)

( * ) Notice: Subject to any disclaimer, the term of this patent is extended or adjusted under 35 U.S.C. 154(b) by 36 days.

(21) Appl. No.: 15/109,457

(22) PCT Filed: Sep. 25, 2014

(86) PCT No.: PCT/EP2014/070434
§ 371 (c)(1),
(2) Date: Jul. 1, 2016

(87) PCT Pub. No.: WO2015/078608
PCT Pub. Date: Jun. 4, 2015

(65) Prior Publication Data
US 2017/0003695 A1    Jan. 5, 2017

(30) Foreign Application Priority Data
Nov. 29, 2013    (DE) .......... 10 2013 224 615

(51) Int. Cl.
*B08B 15/00* (2006.01)
*G05D 7/06* (2006.01)
(Continued)

(52) U.S. Cl.
CPC ......... *G05D 7/0688* (2013.01); *B08B 15/002* (2013.01); *C21C 5/40* (2013.01);
(Continued)

(58) Field of Classification Search
CPC .............. B08B 15/002; C21B 2100/02; C21B 2100/44; C21C 2100/02; C21C 5/40;
(Continued)

(56) References Cited

U.S. PATENT DOCUMENTS 4,521,226 A * 6/1985 Alig .......................... C21C 5/38
95/22
4,753,665 A * 6/1988 Fahey ................... A47L 9/2857
96/408
(Continued)

FOREIGN PATENT DOCUMENTS

CN    102635920 A  *  8/2012
CN    102888488        1/2013
(Continued)

OTHER PUBLICATIONS

Kalore et al., Dynamic Control of a Building Fluid Distribution System, the 2003 IEEE Conference on Control Applications, pp. 1215-1220, Jun. 25, 2003, IEEE Meetings, Conferences & Events (MCE), Piscataway, NJ 08854 USA.*
(Continued)

*Primary Examiner* — Nadine G Norton
*Assistant Examiner* — Christopher Remavege
(74) *Attorney, Agent, or Firm* — Abelman, Frayne & Schwab

(57) ABSTRACT

The invention relates to a control method for a secondary dust removal system in which a pipe network connects an induced draft fan to at least two suction points. The pipe network comprises a controllable exhaust air flap for each suction point, the position of said flap influencing the volumetric flow rate at the suction point. A mathematical model of the pipe network allows the method to energy-efficiently control the exhaust air flaps and the induced draft fan.

5 Claims, 2 Drawing Sheets

(51) Int. Cl.
*C21C 5/40* (2006.01)
*F04D 27/00* (2006.01)
*F04D 17/16* (2006.01)

(52) U.S. Cl.
CPC ...... *C21B 2100/44* (2017.05); *C21C 2100/02* (2013.01); *F04D 17/16* (2013.01); *F04D 27/004* (2013.01); *F05D 2270/3015* (2013.01)

(58) Field of Classification Search
CPC ............. F04D 17/16; F04D 27/004; F05D 2270/3015; G05D 7/0688
USPC ....... 134/18, 56 R, 110, 22.12, 22.18, 104.2, 134/22.11; 15/301, 314; 454/256, 61; 700/276, 86; 703/2
See application file for complete search history.

(56) References Cited

U.S. PATENT DOCUMENTS

| | | | |
|---|---|---|---|
| 4,820,317 A * | 4/1989 | Fahey | A47L 9/2857 95/22 |
| 5,150,769 A | 9/1992 | Major | |
| 5,470,275 A * | 11/1995 | Jacob | B08B 15/023 454/59 |
| 5,505,763 A * | 4/1996 | Reighard | B05B 14/43 95/19 |
| 5,540,619 A | 7/1996 | Ahmed | |
| 6,748,349 B1 * | 6/2004 | Majumdar | G06F 30/20 703/9 |
| 6,865,780 B2 * | 3/2005 | Heinz | D01H 5/66 134/122 R |
| 7,024,258 B2 | 4/2006 | Ahmed | |
| 7,146,677 B2 | 12/2006 | Litomsky | |
| 7,542,885 B1 * | 6/2009 | Majumdar | G06F 30/23 703/2 |
| 8,696,417 B2 * | 4/2014 | Tarr | B08B 15/00 454/62 |
| 2003/0064676 A1 * | 4/2003 | Federspiel | B61D 27/00 454/75 |
| 2004/0186599 A1 * | 9/2004 | Ahmed | G05B 17/02 700/86 |
| 2007/0209653 A1 | 9/2007 | Beisheim | |
| 2012/0322358 A1 * | 12/2012 | Wendorski | F23L 17/005 454/340 |

FOREIGN PATENT DOCUMENTS

| | | |
|---|---|---|
| JP | 2002339011 | 11/2002 |
| JP | 2003183719 | 7/2003 |
| JP | 2004115891 | 4/2004 |
| WO | 9630703 | 10/1996 |

OTHER PUBLICATIONS

John William Kimla, Optimized Control Fan Control in Variable Air Volume HVAC Systems, Texas A&M University, Dec. 2009.

\* cited by examiner

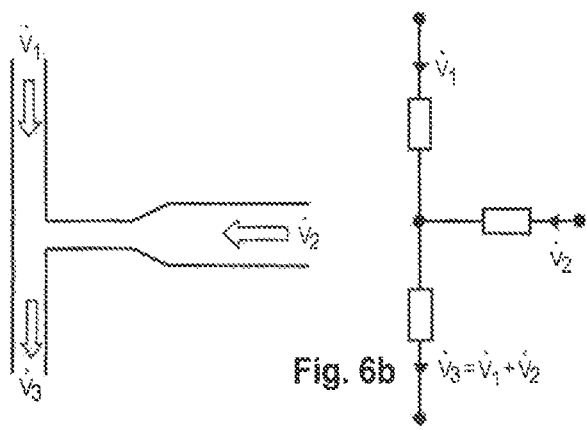
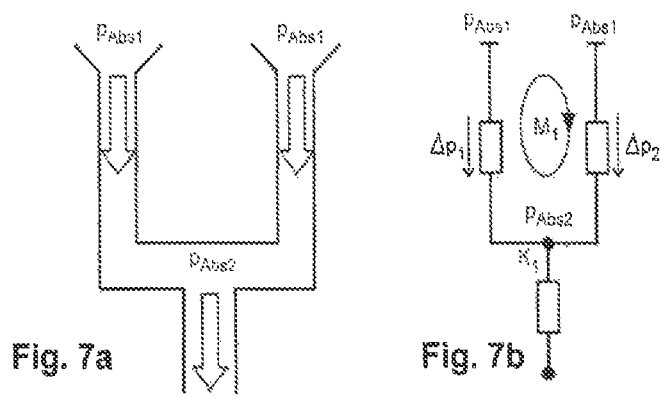
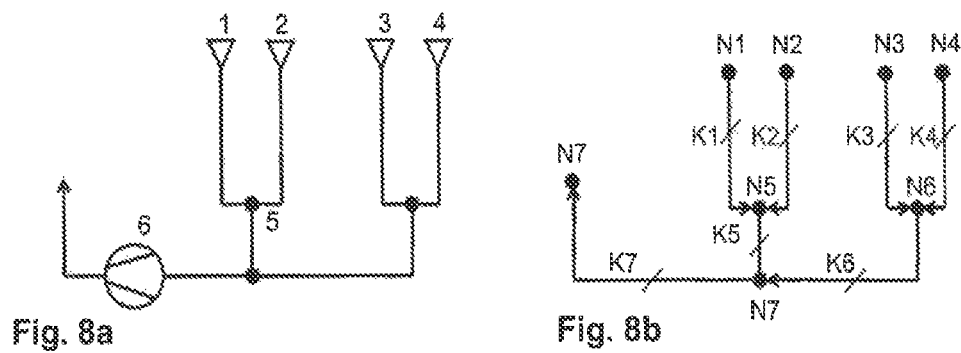

METHOD AND APPARATUS FOR THE ENERGY-EFFICIENT OPERATION OF SECONDARY DUST REMOVAL SYSTEMS

RELATED APPLICATIONS

This application is a National Stage Application of International Application PCT/EP2014/070434 filed Sep. 25, 2014 and claiming priority of German application DE 10 2013 224 615.3 filed Nov. 29, 2013, both applications are incorporated herein by reference thereto.

FIELD OF THE INVENTION

The present invention is oriented to a method and a device for the control of secondary dust removal systems.

BACKGROUND OF THE INVENTION

Dust-laden and sometimes toxic exhaust gases build up during various production processes in a steel plant. Estimates assume that only 15 kilograms of dust are created per ton of steel produced in an electric arc furnace. If one assumes that a medium-sized steel plant produces 400,000 tons of steel a year, each year 6000 tons of dust emissions would therefore accrue.

In order to protect the workers and the environment, it is important to suction away the accruing dust emissions at the point of origin. This suctioning must guarantee that the work place limit values (WLV) of dust-laden emissions are observed. The observance of these values is realized by so called dust removal systems. Dust removal systems are divided into primary and secondary systems. The primary dust removal is responsible for disposing of the dust emissions building up directly at the machines during the melting of steel scrap (e.g., at the electric arc furnace). The secondary dust removal is responsible for disposing of the dust emissions occurring in the production bay. This is done by hood designs situated in proximity to the respective dust source (e.g., at the converter). Such a dust removal system [consists] of three main components, namely, a pipeline network, an induced draft fan, and a filter chamber.

In order to suction away the dust emissions at the respective place of origin, defined volumetric flow rates are needed at the suctioning points. The magnitude of these suctioning volumetric flow rates depends on how heavy is the concentration of the dust emission in the surrounding air and it is determined by a visual estimation during the operation of the system. By a visual estimation is meant the manual adjusting of the volumetric flow rates at the corresponding suction points. For this, during an actual production process the volumetric flow rate is increased at the corresponding suction points until the estimate by the naked eye reveals that all exhaust gases are being transported away by the volumetric flow rate. A measurement of the (WLV) value in the vicinity of the production process is done to verify that the adjusted volumetric flow rate is sufficient. If so, the relevant operating parameters for this (such as partial vacuum in the main channel) are plotted and factored into the control system of the dust removal process.

In order to adjust the required volumetric flow rates at the different suction points, single-vane or (in the case of larger pipe diameters) multiple-vane exhaust air flaps are installed in the pipelines leading to a suction point, which can travel between 0 and 100% in their closed position. The required partial vacuum of a dust removal system is produced by the induced draft fan. This basically consists of two to three key components, namely, an impeller, an electric motor, and possibly a hydraulic coupling or a frequency converter. The electric motor places the impeller in a rotatory movement. The impeller, based on the geometrical arrangement of the vane wheels, then assures a partial vacuum in the pipeline network. This pressure difference between the surrounding pressure and the partial vacuum created in the pipeline network ensures that a volumetric flow rate is produced in the direction of the induced draft fan.

The required delivery power of such a system is defined by the following equation.

$$P_{zu} = \dot{V}_{zu} \Delta P \mu_{es}$$

It is clear from this formula that both the suctioning volumetric flow rate $\dot{V}_{zu}$ and the total pressure loss $\Delta \mu_{ges}$ have major impact on the required delivery power $P_{zu}$ of a secondary dust removal system. For example, if one accepts the practically common values for the suctioning volumetric flow rate of 2,000,000 m³/h of air subjected to dust removal, and assumes that this volumetric flow rate is produced with a pressure difference of 50 mbar, a required delivery power of around 2.78 MW would result for such a dust removal system. This example should show on the one hand how energy-intensive secondary dust removal systems are, and on the other hand point out that it is important to reduce system pressure losses to a minimum.

Patent document EP 0116 727 A2 describes a feedback control method for a dust removal system in which each suctioning point is associated with a feedback control circuit with individual adjustable nominal value. Furthermore, there is an overarching feedback control circuit for the induced draft fan. The feedback control process requires special sensors, which are complicated and costly.

The problem to be solved by the present invention is to disclose a method in the form of a new control concept which enables an energy-efficient operation of secondary dust removal systems and overcomes at least some of the aforesaid drawbacks. Moreover, a device as well as a computer program should be disclosed which implement the method according to the invention. Since an uneconomical operation of secondary dust removal systems at a time of worldwide increasing energy prices is no longer sustainable by the operators of these plants, there is an increasing demand to optimize dust removal systems in terms of energy input.

SUMMARY OF THE INVENTION

The mentioned technical problem is solved by the features of claim 1. This is oriented to a control method for a secondary dust removal system in which a pipeline network connects an induced draft fan to at least two suction points. The pipeline network comprises a controllable exhaust air flap for each suction point, whose flap position influences the volumetric flow rate at the suction point. Moreover, different pressure losses result according to the closing position of the flap. The method involves the following steps:

providing of a mathematical system model which describes the pipeline network, where each pipe element is characterized by its physical and geometrical properties. Preferably, the mathematical model can be represented on the basis of a graph theory approach; in this case, the various pipeline elements are converted to resistance values. The resulting mathematical system model in this case is a resistance network;

calculating of the pressure losses in the pipeline network on the basis of the fully determined mathematical system model and the volumetric flow rates required at the suction points;

calculating of the optimal flap position in terms of energy efficiency for each exhaust air flap and calculating of the pressure loss for the entire system which allows the required operating volumetric flow rates to be achieved with the least possible delivery power;

controlling of the exhaust air flaps so that the calculated flap positions are assured;

controlling of the induced draft fan so that the assigned volumetric flow rates are assured at the different suction points. For this, preferably the rotary speed of the induced draft fan is increased from a position of rest until the calculated pressure loss of the overall system is achieved and thus the volumetric flow rates at the suction points are assured;

The data, parameters and functions required for the mathematical model are calculated and/or determined with the help of the following quantities:

coefficients of resistance characterizing the pipe elements through which the flow occurs;

geometrical properties of the pipe elements through which the flow occurs;

physical properties of the pipe elements through which the flow occurs (e.g., heat conductivity, which can be indicated by the coefficients of heat transfer);

volumetric flow rates through the pipe elements;

Preferably, the method can include the calculating of each closing position of an exhaust air flap of the pipeline network, wherein at least one pipe string connects the induced draft fan to one exhaust air flap each time. Moreover, the pipe string of the highest pressure loss can be determined with the flap fully open. The corresponding exhaust air flap is preferably determined by the method as being 100% open.

The rest of the flap positions can be determined in the method by a calculation on the basis of the mathematical model. Thus will use on the one hand the information of the graph theory approach, and on the other hand required information will be obtained from the laws of physics (such as mesh and node rules). As a result, one gets the open position of all exhaust air flaps in the pipeline network. These correspond to the adjustable resistance value of the exhaust air flap.

The pipeline network preferably comprises a main string, which is connected to the induced draft fan and which branches into at least two secondary strings, each of which is connected to at least one suction point. The secondary strings can branch further and thus result in an enlargement of the mathematical representation.

Preferably, the method can involve the following additional steps:

calculating of the pressure losses in the main string based on the geometrical and physical properties, as well as the corresponding operating volumetric flow rates of the different pipeline elements;

calculating of the pressure losses in the secondary strings based on the geometrical and physical properties, as well as the corresponding operating volumetric flow rates of the different pipeline elements;

calculating of the overall pressure loss of the entire system (from the suction point to the induced draft fan);

The pipeline network can consist of components of different geometry and dimension. Preferably, the pipeline network is composed of pipe elements which comprise straight pipe elements, curves, expansions, reductions, and merging points (such as T-pieces). The resistance value of a pipe string is found by adding up the resistance values of the pipe elements of which the pipe string is composed.

The invention is likewise oriented to a control device for a secondary dust removal system, in which a pipeline network connects an induced draft fan to at least two suction points, wherein the pipeline network comprises a controllable exhaust air flap for each suction point, whose flap position influences the volumetric flow rate at the suction point. The control device is characterized in having the following elements:

a storage element for providing a resistance network, which represents a mathematical system description. The required data here is characterized by physical functions and values, as well as geometrical dimensions. Each pipe element of the pipeline network is characterized by its physical and geometrical properties;

a computer unit, which can read out the storage element, and which is configured to compute pressure losses in the pipeline network based on the geometrical arrangement of the resistance network and the volumetric flow rates required at the different suction points, the computer unit being further configured to calculate the flap position for each exhaust air flap and the overall pressure loss of the system making it possible to assure the required volumetric flow rates at the suction points with the lowest possible pressure loss of the overall system.

a control unit which as an input interface detects the partial vacuum by suitable sensors in the main channel and increases the rotary speed of the induced draft fan until the detected pressure matches up with the computed pressure. The rotary speed of the induced draft fan is increased on the basis of the computed pressure loss of the overall system until it prevails in the system. Furthermore, the calculated flap positions of the exhaust air flaps are controlled on the basis of the flap positions determined by the control unit.

The device can furthermore comprise reading means, which make it possible to read the physical quantities describing the pipeline network into the storage element. The computer unit can moreover be configured to set up a resistance network by means of these quantities which describes the pipeline network, and to save this in the storage element.

The computer unit can furthermore be configured preferably to carry out the method steps according to the invention.

Moreover, the invention is oriented to a computer which is suitable to implementing the method according to the invention.

The invention is likewise oriented to a computer program and a program for a storage-programmable control system, which comprises computer-readable and logic commands which, when implemented by a computer or a storage-programmable control system, cause the computer or the storage-programmable control system to carry out the method according to the invention.

Furthermore, the invention is oriented to a computer program product which comprises a computer-readable medium on which this computer program is stored. Likewise, this invention is oriented to products for storage-programmable control systems which make it possible to store programs for storage-programmable control systems.

The method according to the invention enables an energy-efficient operation of a secondary dust removal system. Since the method is based on a mathematical model of the pipeline system, it requires no feedback control circuit and is therefore easy to implement. The method can design a dust removal system by entering the desired volumetric flow rates by means of a graph theory computation implemented in a mathematical model with the help of physical rules and laws so that the volumetric flow rates at the different suction points can be optimally adjusted. As compared to known control methods, the use of the method according to the invention has produced energy savings of over 25%. The induced draft fan and the exhaust air flaps are not needlessly stressed, which reduces the wear and tear. No unnecessarily high partial vacuums are generated in the system and the volumetric flow rates achieved correspond to the required volumetric flow rates. Moreover, the method is flexible in regard to expansions of the dust removal system: it is enough to adapt the mathematical model to the expanded system in order to calculate the new optimal settings by means of the method. Thus, lengthy standstill for resumption of operations is avoided.

BRIEF DESCRIPTION OF THE FIGURES

In what follows, the figures of the sample embodiments are briefly described. Further details will be found in the detailed description of the sample embodiments. There are shown:

FIGS. 6a and 6b, a node in a pipeline network and the equivalent resistance network;

FIGS. 7a and 7b, a mesh in a pipeline network and the equivalent resistance network;

FIG. 8a, a diagram of a sample pipeline network of a secondary dust removal system;

FIG. 8b, a diagram of a resistance network which characterizes the pipeline network of a secondary dust removal system.

DETAILED DESCRIPTION OF THE SAMPLE EMBODIMENTS

The new control concept according to the invention is based on the idea of forming a mathematical model of the secondary dust removal system and performing a computation with the help of provided plant data, resulting in the flap positions and the overall pressure loss of the system. On the basis of these computations, the exhaust air flaps of the system are moved into the corresponding position and the rotary speed of the induced draft fan is increased from an original position of rest until the pressure loss of the overall system produced in this way (measured in the main channel) reaches the level of the calculated overall pressure loss.

Figure 1:
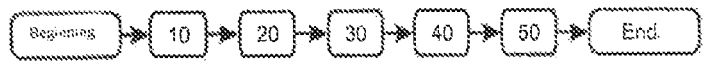
FIG. 1, a process flow chart of the method according to the invention.

In a first step, a mathematical system description is represented on the basis of a graph theory approach and the plant data in a control system software. This corresponds to step 10 in FIG. 1.

In the next step, an algorithm factoring in the system properties and process requirements computes the pressure losses in the system (step 20) and, on this basis, the optimal position of each flap and the overall pressure loss of the system (step 30). On the basis of this provided information, the flaps of the system are placed in the respective position (step 40) and the rotary speed of the induced draft fan is increased until the pressure loss computed by the algorithm is achieved (step 50).

The result is a control system which makes it possible to adjust the previously defined volumetric flow rate at each suction point and reduce to a minimum the overall pressure loss in the system.

This describes the fundamental principle of the invention. The further explanations describe preferred embodiments of the invention and allow the skilled person to implement the method.

Figure 2:
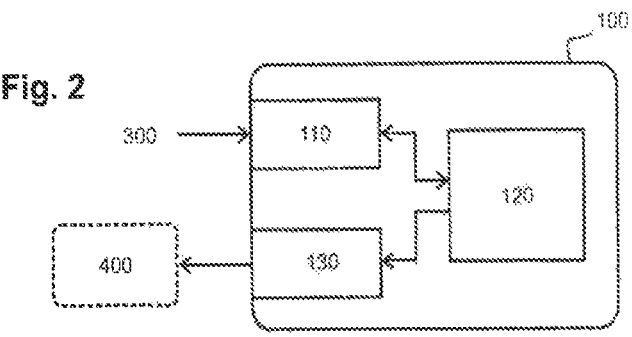
FIG. 2, a schematic representation of a preferred embodiment of the device according to the invention.

As is shown in FIG. 2, the invention likewise involves a device 100, which serves to implement the method. The device comprises a storage element 110, a computer device 120, and a control element 130. In the storage element, a mathematical model 300 of the pipeline network of a secondary dust removal system is saved. With the aid of this data, a computer device 120 calculates the control variables in harmony with the method according to the invention. The resulting flap positions are relayed via the control element 130 to the secondary dust removal system 400. The rotary speed of the induced draft fan of the dust removal system 400 is increased until the pressure loss of the overall system as detected by a suitable sensor agrees with the calculated pressure loss of the computer device 120. The control element 130 increases or decreases the rotary speed for the respective process stage.

In a preferred embodiment, the mathematical model is a graph theory representation of a secondary dust removal system, which can be described and computed by the memorized physical quantities and functions, as well as geometrical dimensions of the various pipeline elements. The resulting model can be described as a resistance network.

Fundamentals of the Mathematical System Design

In order to translate pipeline networks into a mathematical model, it is important to identify and calculate significant physical quantities.

It should be noted that three simplifications are assumed in this description for an efficient computation. These simplifications allow the reader to follow the mode of functioning of the method, yet without limiting the latter in any way.

It is assumed that the gas composition for dry air (78.08% $N_2$; 20.95% $O_2$; 0.93% Ar; 0.04% $CO_2$) prevails at each suction point. A specific gas constant of $R_S=287.058$ J/(kgK) is assumed.

The absolute pressure is assumed to be constant ($p_{Abs}=101325$ Pa) for the calculation of the density at various places in the network.

The pipeline network undergoes no temperature loss, i.e., an adiabatic system behavior is assumed.

Behavior of the Physical Quantities in the System

Determination of the Density of the Suctioned Gas

The density of the suctioned gas plays a major role in the calculation of pipeline networks, since volumetric flow rates also vary with increasing or decreasing density. The density of the suctioned gas can be calculated by the following equation 2

$$\rho = \frac{p_{Abs}}{R_s T_{Abs}} \quad (2)$$

As is evident from the equation, the absolute ambient pressure $p_{Abs}$, the ambient temperature $T_{Abs}$, and the specific gas constant $R_S$ have influence on the density of the gas. The specific gas constant, as well as the absolute pressure, can be seen as constant quantities in the mentioned method.

Pressure Loss Due to Flow Resistances

When a medium flows through a physical body, the latter presents a resistance, which results in a pressure loss. For the controlling of the flap positions, the pressure losses of the different pipeline strings are detected and included in the mathematical system description. For a unified calculation, the pressure loss of the different components of a dust removal system is used as a nondimensional factor with the help of the coefficient of resistance zeta in the formulas). This factor is a measure of how much of a pressure loss is caused by a component when a flow occurs through it. The following equation 3 shows how the pressure loss is dependent on the coefficient of resistance, the gas density and the flow velocity of the medium.

$$\Delta p = \frac{1}{2} \zeta \rho v^2 \quad (3)$$

How the zeta values of different components are determined will be described in the following description.

Converting of Normal Volumetric Flow Rate into Operating Volumetric Flow Rate

It is customary to use so-called normal volumetric flow rates to indicate the required volumetric flow rates in dust removal systems. These refer to a theoretical and idealized comparison value. Usually the following standardized values are used for normal volumetric flow rates [6].

normal temperature=273.15 K
normal pressure=101325 Pa

Since secondary dust removal systems are generally not operated at this point, one must compute the actual operating volumetric flow rate for a deviating temperature. With the assumed simplification that constant ambient pressure prevails at every point, the operating volumetric flow rate $\dot{V}_B$ can be computed from the normal volumetric flow rate $\dot{V}_N$ and the ratio of the operating temperature $T_B$ to the normal temperature $T_N$ (equation 4).

$$\dot{V}_B = \dot{V}_N \frac{T_B}{T_N} \quad (4)$$

Temperature Change Due to Mixing of Volumetric Flow Rates

If volumetric flow mingling occurs in a secondary dust removal system, with several volumetric flow rates of different temperatures, the new mixture temperature should be determined for further computations. With the described simplification that the same gas composition prevails at each suction point, one gets equation 5, which determines the mixture temperature by a simple ratio calculation.

For this, the individual normal volumetric flows are weighted with the respective temperature and divided by the sum of all normal volumetric flows:

$$T_{neu} = \frac{\dot{V}_{N1} T_1 + \ldots + \dot{V}_{Nn} T_n}{\dot{V}_{N1} + \ldots + \dot{V}_{Nn}} \quad (5)$$

Determination of the Required Coefficients of Resistance

In this section we shall discuss the calculation of coefficients of resistance of various pipeline elements. The coefficient of resistance plays a significant role in the calculation of pipeline networks, since is it a direct measure of the causative pressure loss of a pipeline element and also has influence on the dimensioning of pipeline elements.

The following equation 6 shows the definition of the coefficient of resistance.

$$\zeta = \frac{2\Delta p}{\rho v^2} \quad (6)$$

In order for the determination of the coefficient of resistance to be useful in practice, it is recommended to determine this value empirically, since a calculation of this value would be very complicated on account of the influence of many physical quantities. As follows from equation 6, for an empirical determination of the coefficient of resistance one must measure the pressure loss and the flow velocity. The density of the medium can be calculated by equation 2.

Practical Determination of the Coefficients of Resistance of Partial Sections

For sections of pipeline elements which experience no direct volumetric flow mingling or volumetric flow separation the coefficient of resistance can be assumed to be a constant quantity. In order to keep the measurement and computation expense as low as possible, the longest possible partial sections with different pipeline elements are combined into a single coefficient of resistance. A partial string, for example, can consist of several pipeline elements such as straight pipe elements, curves, expansions and T-pieces.

By the measurement of the absolute pressures at the inlet $p_1$ and outlet $p_2$ of the partial string, one can determine the pressure drop in the partial string with the help of equation 7.

$$\Delta p = p_1 - p_2 \quad (7)$$

By means of a Pitot tube, furthermore, the flow velocity in a partial string can be measured. If the measured pressure drop, as well as the determined flow velocity, is inserted into equation 6, one gets the coefficient of resistance of the partial section.

Practical Determination of the Coefficients of Resistance of T-Pieces

Figure 3:
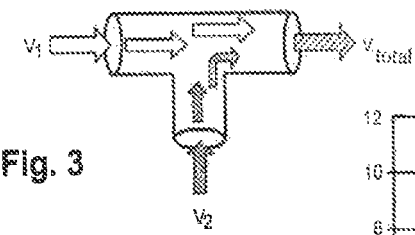
FIG. 3, a schematic representation of a pipe element.

T-pieces have dynamically varying coefficients of resistance. At a volume flow mingling or volume flow separation, a nonlinear relation exists with the resulting pressure loss. FIG. 3 shows a volume flow mingling in a T-piece.

In the technical literature on fluidics it is customary to relate the coefficient of resistance of a T-piece to the overall flow velocity of the mingling partial flows. This procedure is not usable for the control concept presented in this work, because the coefficients of resistance must be coordinated with the respective partial strings in order to compute the flap positions. It is recommended to likewise determine empirically the function of the coefficient of resistance, since the available functions in the literature are subject to large constraints. Due to these constraints, the coefficients of resistance so determined differ greatly from the true values.

In the empirical determination, one forms the ratio of the partial volume flow and the total volume flow. For this condition, a pressure loss measurement per equation 7 is carried out and the flow velocity in the partial string is measured.

Figure 4:
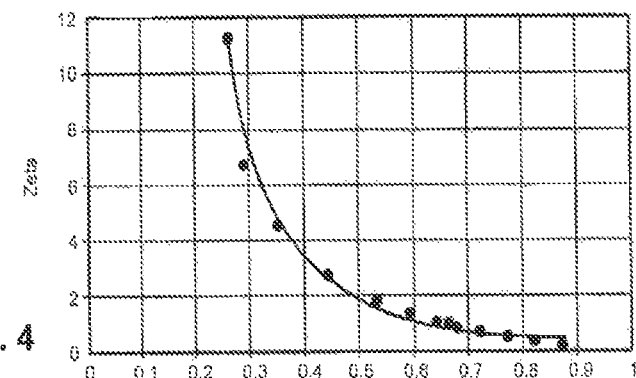
FIG. 4, the coefficient of resistance determined for the pipe element of FIG. 4, dependent on the volumetric flow rate through the element.

If one performs this measurement for different volume flow ratios and computes for each ratio the coefficient of resistance with equation 6, one gets for example the result in FIG. 4. This figure shows the coefficient of resistance of the straight section of the T-piece, plotted against the volume flow ratio.

For an automated control system, this characteristic curve must be translated into a function, so that a verdict as to the magnitude of the coefficient of resistance is obtained for each volume flow ratio. For this, the curve is approximated by a function. This conversion is done with the aid of algorithms which are known in themselves and requires no further description in this regard. For the example in FIG. 4, one gets the following equation 8.

$$f(x) = 0.2764 x^{-2.74} \tag{8}$$

The specific behavior of a pipe element depends, of course, on the components used and can be determined by means of the described steps for any given pipe components and especially for any given merging element.

Practical Determination of the Coefficients of Resistance of Exhaust Air Flaps

The coefficient of resistance of exhaust air flaps is primarily dependent on the closing position of the flaps. It is therefore advisable to perform a measurement of the coefficient of resistance in dependence on the closing position. The empirical determination of the resistance is necessary, since the coefficients of resistance in the literature and in various simulation programs differ greatly from one another. For the determination of these values, a characteristic curve is likewise used by the same method as was described for the T-piece.

In order to determine the coefficient of resistance of a flap, the flap is moved in succession to various closing positions. For each closing position, the resulting pressure loss as well as the flow velocity are measured. Then, with equation 6, the coefficient of resistance can be calculated. The following FIG. 5 shows a sample plotted curve of a single-vane exhaust air flap.

Figure 5:
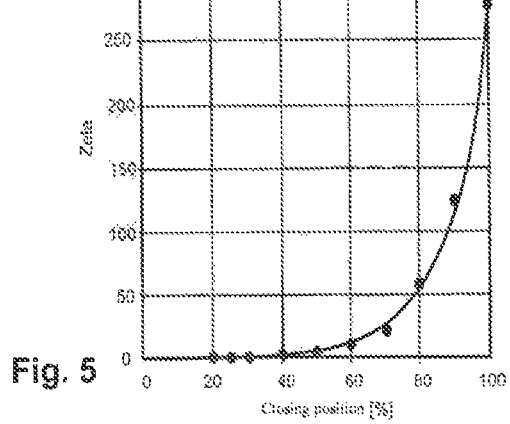
FIG. 5, the coefficient of resistance determined for a controllable exhaust air flap, dependent on the closing position of the flap.

If the curve of the example in FIG. 5 is approximated as a function, one gets equation 9.

$$f(x) = 0.1061 e^{0.0776x} \tag{9}$$

Since the control algorithm of the invention requires the function of the closing position in dependence on the coefficient of resistance, the inverse function (equation 10) is formed from equation 9.

$$f(x) = 12.8866(\ln(x) + 2.24337 \tag{10}$$

This function is suitable to being saved in the control algorithm With it, the closing position of the flap can be determined for a required coefficient of resistance.

Transformation of a Pipeline Network into a Mathematical System Model

Derivation of the Quadratic Resistance Law

By analogy with electrical engineering, it is possible to convert pipeline networks into resistance networks. For this representation, it is necessary to transform the various elements of a pipeline network into resistances. This is done by the pressure loss equation for turbulent flows after Darcy (equation 11). This describes the pressure loss in straight pipe sections. Here, λ represents the coefficient of friction of the pipe and d the diameter of the pipeline element.

$$\Delta p = \frac{\lambda l \rho}{2 d A^2} \dot{V}^2 \tag{11}$$

If the pressure loss computation is done with the aid of the coefficient of resistance, equation 11 can be converted into equation 12.

$$\Delta p = \frac{\zeta \rho}{2 A^2} \dot{V}^2 \tag{12}$$

$$\text{with } \zeta = \lambda \frac{l}{d}$$

From this equation, the quadratic resistance law (equation 13) can be derived, since the pressure loss $\Delta p$ is equal to the product of the resistance R and the square of the volumetric flow rate $\dot{V}$.

$$\Delta p = R \dot{V}^2 \tag{13}$$

$$\text{with } R = \frac{\zeta \rho}{2 A^2}$$

With the help of equation 13, it is possible to transform the various pipeline elements into a resistance value.

Node and Mesh Rules in Pipeline Systems

By analogy with the Kirchhoff rules of electrical engineering, similar rules apply in a pipeline network. These rules are used in the control algorithm in order to compute the network.

Node Rule in Pipeline Systems

If a node point occurs in a pipeline network, as in FIG. 6a, volume flows will merge or separate there. The corresponding resistance network is shown in FIG. 6b.

The node rule states that the addition of all inflows and outflows in a node results in a value of zero. Volume flows coming into the node are given a positive value. Outgoing volume flows are given a negative value. Mathematically, the following summation formula (equation 14) expresses this relationship, where k is the number of adjoining partial strings.

$$\sum_{n=1}^{k} \dot{V}_n = 0 \tag{14}$$

With the help of this node rule, it is possible for known volume flow inputs to calculate the size of the volumetric flow rate of each partial string.

Mesh Rule in Pipeline Systems

The mesh rule for pipeline systems states that the sum of all pressure losses of a mesh results in a value of zero. FIG. 7a shows such a mesh. FIG. 7b shows the corresponding resistance network. As can be seen in FIG. 7b, for this one determine a mesh in the network and travels in clockwise direction. Pressure losses in the clockwise direction have a positive value, while pressure losses in counterclockwise direction have a negative value.

This relationship is expressed in a formula by equation 15. Here, 1 indicates the number of branches belonging to a mesh.

$$\sum_{n=1}^{l} \Delta p_n = 0 \quad (15)$$

With the help of the mesh rule, it is possible to calculate hitherto unknown pressures in a pipeline system.

Dividing Up the Partial Strings into Resistances

If one considers a partial string of a secondary dust removal system, it will be seen that it consists of a plurality of different pipeline elements such as curves, expansions or reductions.

Each partial string is divided up into various partial resistances, distinguishing the following.

Dynamic resistances of exhaust air flaps, here the coefficient of resistance is a function of the closing position (%);

Dynamic resistances of T-pieces, here the coefficient of resistance is a function of the volume flows;

Constant resistances of other pipeline elements.

On the basis of these rules, it is obvious that a pipeline network can be converted into a mathematical system model, e.g., a resistance network, which describes the pipeline network. In the control concept according to the invention, the pressure losses of the various partial strings are computed by using the quadratic resistance law and the mesh and node rules. The described rules make it possible to describe pipeline networks which connect an induced draft fan to a plurality of suction points, wherein a main string connected to the induced draft fan can branch multiple times like a tree, and wherein at the end of each branch a suction point is connected. By iterative application of the node and mesh rules, the pressure relations in the overall tree structure are calculated.

Calculation Example

The calculation shown is explained by an imaginary pipeline network with four suction points 1-4 and one induced draft fan 6. For example, a T-piece 5 is represented as a merging piece. This computation is such as is carried out preferably by an arithmetic unit of a computer or a control system. FIG. 8a shows a schematic representation of a secondary dust removal system. On the basis of a graph theory approach, such a network can be converted into an edge and node relation (FIG. 8b). The foundation for a mathematical system description is created by weighting the edges K1-K7 with the physical system quantities and functions, as well as by known geometrical dimensions of the individual components. Such system quantities can be, for example, the following listed properties:

geometrical dimensions of the pipeline elements;
fixed coefficients of resistance of the pipeline elements;
dynamic coefficient of resistance functions of the pipeline elements;
heat transfer coefficient of the pipeline elements;
pressure increase or pressure decrease due to leakage, booster blower, or the like.

If this information is saved in the storage unit of the corresponding computer or control unit and a complete description of the nodes and edge relations as well as their affiliation is in hand (e.g., in the form of an adjacency matrix), the computer unit can start to determine the following values for the nodes N1-N8 in the system with the help of an algorithm and the specification of the required normal volume flows and temperatures at the suction points:

temperature in the pipeline elements;
density in the pipeline elements;
operating volume flows.

The calculation is thus done by known physical formulas or formulas adapted to this instance (such as Riechmann mixing rules). As the outcome of the computation, one gets the operating volume flow, the density of the suctioned medium, and the temperature of the medium at each node point.

In order to operate such a secondary dust removal system with energy efficiency, the suction point which causes the highest pressure loss must be known. This is ascertained with the help of the information from the weighted edges and nodes. A determination is made as to which path from the induced draft fan to a suction point causes the highest pressure loss (with flap fully opened). For this, the resistance values of the various pipelines are determined by the quadratic resistance law for turbulent flows. These resistance values are multiplied by the square of the volume flows of the respective pipe strings. As the result, one gets the pressure loss of the particular pipe string. Since consecutive pressure losses can be added (validity of mesh and node rules in pipeline networks), the highest pressure loss can thus be determined. The exhaust air flap of this string is 100% opened, all other flaps are adapted in their opening position so that the mesh rule continues to be valid for the required normal volume flows.

The above indicated sample embodiments serve primarily for a better understanding and should not be construed as a limitation. The scope of protection of the present patent application results from the patent claims.

The features of the described sample embodiments can be combined with or exchanged for each other. Moreover, the described features can be adapted by the skilled person to existing circumstances or present requirements.

The invention claimed is:

1. Control method for a secondary dust removal system (400) in which a pipeline network connects an induced draft fan to at least two suction points, wherein the pipeline network comprises a controllable exhaust air flap for each suction point, whose flap position influences a volumetric flow rate at the suction point, and wherein the control method
is characterized in that it involves the following steps:
providing a mathematical system model (300) which describes the pipeline network based on physical and geometrical properties (10) of all of the pipeline network elements and their functions;
calculating pressure losses in the pipeline network on the basis of the fully determined mathematical system model and the volumetric flow rates required at the suction points (20);
calculating of the flap position for each exhaust air flap and a pressure loss for the secondary dust removal system which allows the required operating volumetric flow rates to be achieved with the least possible delivery power (30);
controlling of the exhaust air flaps so that the calculated flap positions are assured (40);
controlling of the induced draft fan so that its rotary speed is increased until the calculated pressure loss for the entire system is achieved and the volumetric flow rates are assured at the suction points (50),
wherein the physical properties of the pipe line elements are based on following quantities:
coefficients of resistance characterizing the pipe elements through which the flow occurs;

geometrical properties of the pipe elements through which the flow occurs;

coefficient of heat transfer of the pipe elements through which the flow occurs;

volumetric flow rates through the pipe elements.

2. Control method according to claim 1, wherein the pipeline network comprises a main string, which is connected to the induced draft fan and which branches into at least two secondary strings, each of which is connected to at least one suction point.

3. Control method according to claim 2, wherein the calculation steps (20, 30) include the following additional steps:

calculating of the pressure losses in the main and secondary strings based on the given geometrical and physical properties and the volumetric flow rates calculating of the pressure loss of the entire system by the mesh rule.

4. Control method according to claim 1, wherein the pipeline network is composed of various pipe elements which include straight pipe elements, curves, expansions, reductions, and merging points.

5. Control method according to claim 1, wherein the step of controlling of the induced draft fan includes increasing its rotary speed from the position of rest.

* * * * *